United States Patent
Nakanishi et al.

(10) Patent No.: US 7,505,656 B2
(45) Date of Patent: Mar. 17, 2009

(54) OPTICAL FIBER AND OPTICAL FIBER DEVICE

(75) Inventors: Tetsuya Nakanishi, Yokohama (JP);
Takemi Hasegawa, Yokohama (JP);
Masaaki Hirano, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/896,999

(22) Filed: Sep. 7, 2007

(65) Prior Publication Data
US 2008/0063346 A1 Mar. 13, 2008

(30) Foreign Application Priority Data
Sep. 12, 2006 (JP) .............................. 2006-246879

(51) Int. Cl.
*G02B 6/02* (2006.01)
*H01S 3/00* (2006.01)
(52) U.S. Cl. .................................... 385/123; 359/341.1
(58) Field of Classification Search ................. 385/123; 359/341
See application file for complete search history.

(56) References Cited
U.S. PATENT DOCUMENTS

| | | | |
|---|---|---|---|
| 4,372,647 A | 2/1983 | Okamoto et al. | |
| 5,170,457 A | 12/1992 | Jen | |
| 6,181,858 B1* | 1/2001 | Kato et al. | 385/123 |
| 6,792,187 B2* | 9/2004 | Andrus et al. | 385/123 |
| 6,856,740 B2* | 2/2005 | Balestra et al. | 385/123 |
| 7,008,892 B2* | 3/2006 | Bourova et al. | 501/37 |
| 2004/0028364 A1 | 2/2004 | Moridaira et al. | |
| 2004/0114894 A1 | 6/2004 | Andrus et al. | |
| 2005/0168805 A1* | 8/2005 | Aiso | 359/341.1 |

OTHER PUBLICATIONS

Li et al, "Fiber Designs for Reducing Stimulated Brillouin Scattering," Optical Fiber Conference, Mar. 7, 2006, paper OTuA4.*
European Search Report, issued in corresponding European Patent Application No. 07017720.9-2216 dated on Jan. 14, 2008.

(Continued)

*Primary Examiner*—Frank G Font
*Assistant Examiner*—Robert Tavlykaev
(74) *Attorney, Agent, or Firm*—McDermott Will & Emery LLP

(57) ABSTRACT

An optical fiber and an optical fiber device, which can suppress generation of the stimulated Brillouin scattering while maintaining large nonlinearity. The fiber includes a central core which is made of $SiO_2$ as a main component and contains $Al_2O_3$ at concentration of 15 wt % or more. The fiber is allowed to propagate only a fundamental mode and has an absolute value of chromatic dispersion of 5 ps/nm/km or less at a predetermined wavelength. The device includes the fiber having the above composition. The fiber guides first light and second light having different wavelengths to propagate therethrough such that the first light and the second light interact with each other by a nonlinear optical phenomenon during the propagation, thus causing the fiber to output the first light or the second light modulated by the nonlinear optical phenomenon or third light newly produced by the nonlinear optical phenomenon and having a different wavelength.

7 Claims, 6 Drawing Sheets

OTHER PUBLICATIONS

Jaewang Yu "Analysis of Brillouin Frequency Shift and Longitudinal Acoustic Wave in a silica Optical Fiber with a Triple-Layered Structure" Journal of Lightwave Technology, vol. 21, No. 8 Aug. 2003, pp. 1779-1786.

R.G. Smith "Optical Power Handling Capacity of Low Loss Optical Fibers as Determined By Stimulated Raman and Brillouin Scattering" Applied Optics, vol. 11, No. 11, Nov. 1972, pp. 2489-2494.

"Role of Guided Acoustics Wave Properties in Single-Mode Optical Fibre Design" Electronics Letters, vol. 24, No. 23, Nov. 10, 1988.

Dragic, P., et al., "Optical Fiber With an Acoustic Guiding Layer for Stimulated Brillouin Scattering Suppression", CLEO, CThZ3, 2005.

Onishi, M., "Highly Nonlinear Optical Fibers and Their Applications", ECOC '99, 2001, pp. II-216-II-219.

Levelut, C., et al., "Dynamic sound attenuation at hypersonic frequencies in silica glass", Physical Review B 73, 2006, No. 52202.

Hansryd, J., et al., "Increase of the SBS Threshold in a Short Highly Nonlinear Fiber by Applying a Temperature Distribution", Journal of Lightwave Technology, Nov. 2001, pp. 1691-1697, vol. 19, No. 11.

* cited by examiner

OPTICAL FIBER AND OPTICAL FIBER DEVICE

BACKGROUND OF THE INVENTION

1. Field of the Invention

The present invention relates to an optical fiber and an optical fiber device.

2. Description of the Related Art

A highly nonlinear optical fiber is an optical fiber having a larger nonlinear coefficient as compared with a standard optical transmission fiber in an optical communication system (see, e.g., M. Onishi, ECOC'99, pp. II-216-II-219). Such a highly nonlinear optical fiber is used, as a medium for generating a nonlinear optical phenomenon, in optical devices such as an optical switch, an optical amplifier, and an optical generator. It is known that performance of the optical devices is restricted by generation of stimulated Brillouin scattering (SBS).

The term "stimulated Brillouin scattering" means a phenomenon that when light having power over a certain threshold is launched into an optical fiber, a part of the light is reflected and, therefore, the light cannot propagate through the fiber at high intensity. In order to enhance the efficiency of generating nonlinear optical phenomena, an effective area of highly nonlinear optical fiber is designed to be small to increase the power density of transmitting light. This design makes the stimulated Brillouin scattering to be generated more easily as compared with the standard optical transmission fiber. As a result, the intensity of the transmitted light is restricted and the efficiency of the optical device is restricted.

In view of the above-described problem, J. Hansryd, et al., J. Lightwave Techn. Vol. 19, pp. 1691-1697(2001) (Document 1) and U.S. Pat. No. 5,170,457 propose techniques for suppressing the generation of the stimulated Brillouin scattering in the highly nonlinear optical fiber. The technique described in Document 1 is to increase a threshold of the stimulated Brillouin scattering in a manner in which a temperature gradient applied to the optical fiber is utilized. The technique described in U.S. Pat. No. 5,170,457 is to increase a threshold of the stimulated Brillouin scattering in a manner in which the optical fiber is designed such that acoustic waves are not guided through a core.

However, the technique described in Document 1 is not satisfactory from the practical point of view because large energy had to be consumed to hold the desired temperature and a large-scale arrangement is required. U.S. Pat. No. 5,170,457 suggests that concentration of $Al_2O_3$ included as a dopant in the optical fiber is preferably held within a range not exceeding 8 wt %. In other words, U.S. Pat. No. 5,170,457 does not take into consideration the concentration of $Al_2O_3$, i.e., 12 wt %, which is required to obtain large nonlinearity.

SUMMARY OF THE INVENTION

The object of the present invention is to provide an optical fiber and an optical fiber device, which can suppress generation of the stimulated Brillouin scattering while maintaining large nonlinearity.

To achieve the above object, the present invention provides an optical fiber including a central core which is made of $SiO_2$ as a main component and contains $Al_2O_3$ at concentration of 15 wt % or more, the optical fiber being allowed to propagate only a fundamental mode and having an absolute value of chromatic dispersion of 5 ps/nm/km or less at a predetermined wavelength. The predetermined wavelength is, e.g., a wavelength within a range of 1.4 μm-1.7 μm.

The optical fiber, preferably, has an effective area of 15 μm² or less at the predetermined wavelength, and has a threshold of stimulated Brillouin scattering larger than, by 3 dB or more, that of an optical fiber including a central core made of $GeO_2$-$SiO_2$ glass and having a similar refractive index profile. In the optical fiber, the central core preferably contains one or more elements selected from among Ge, P, Ba, Pb, Ga, In, and Tl. Preferably, the optical fiber according to the present invention has a transmission attenuation of 70 dB/km or less at a wavelength of 1.55 μm. The optical fiber preferably further includes a depressed region surrounding the central core and having a negative relative refractive index difference with respect to $SiO_2$, and a cladding surrounding the depressed region and having a larger refractive index than the depressed region.

In addition, the present invention provides an optical fiber device including an optical fiber having a central core which is made of $SiO_2$ as a main component and contains $Al_2O_3$ at concentration of 15 wt % or more, the optical fiber guiding first light and second light having different wavelengths such that the first light and the second light interact with each other by a nonlinear optical phenomenon during the propagation, thus causing the optical fiber to output the first light or the second light modulated by the nonlinear optical phenomenon or third light newly produced by the nonlinear optical phenomenon and having a different wavelength.

One of the first light and the second light is light to be amplified, preferably, and the other of the first light and the second light is pump light modulated at a frequency of 1 GHz or lower, the pump light amplifying the light to be amplified in the optical fiber. As an alternative, one of the first light and the second light is light to be amplified, preferably, and the other of the first light and the second light is pump light, the pump light being launched into the optical fiber without being modulated, thus amplifying the light to be amplified in the optical fiber.

DETAILED DESCRIPTION OF THE INVENTION

The above-mentioned features and other features, aspects, and advantages of the present invention will be better understood through the following description, appended claims, and accompanying drawings. In the explanation of the drawings, an identical mark is applied to identical elements and an overlapping explanation will be omitted.

Figure 1A:
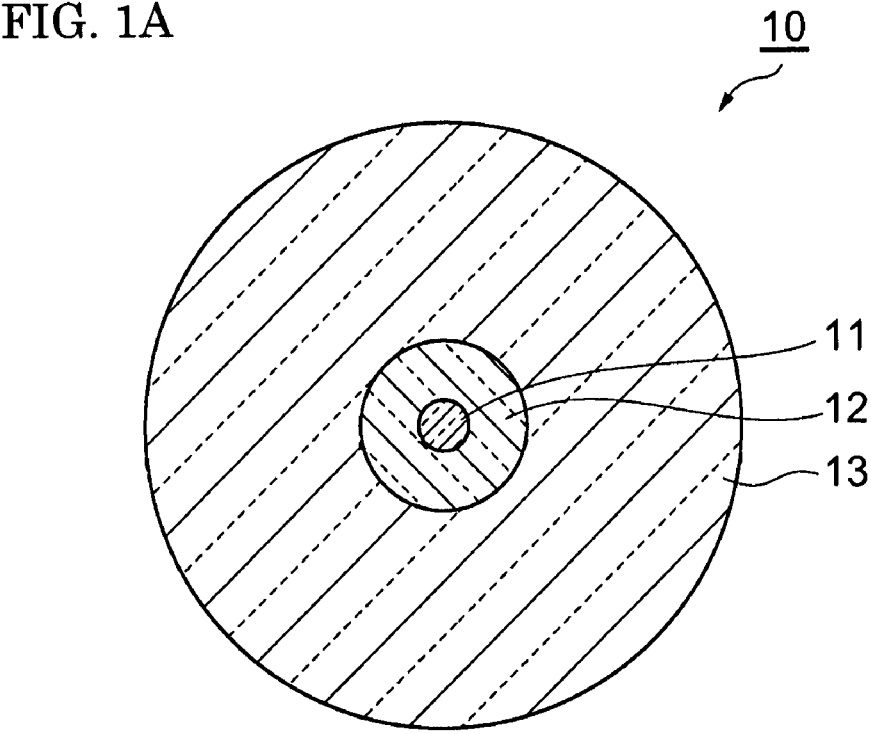
FIG. 1A is a cross-sectional view of an optical fiber according to an embodiment of the present invention.
Figure 1B:
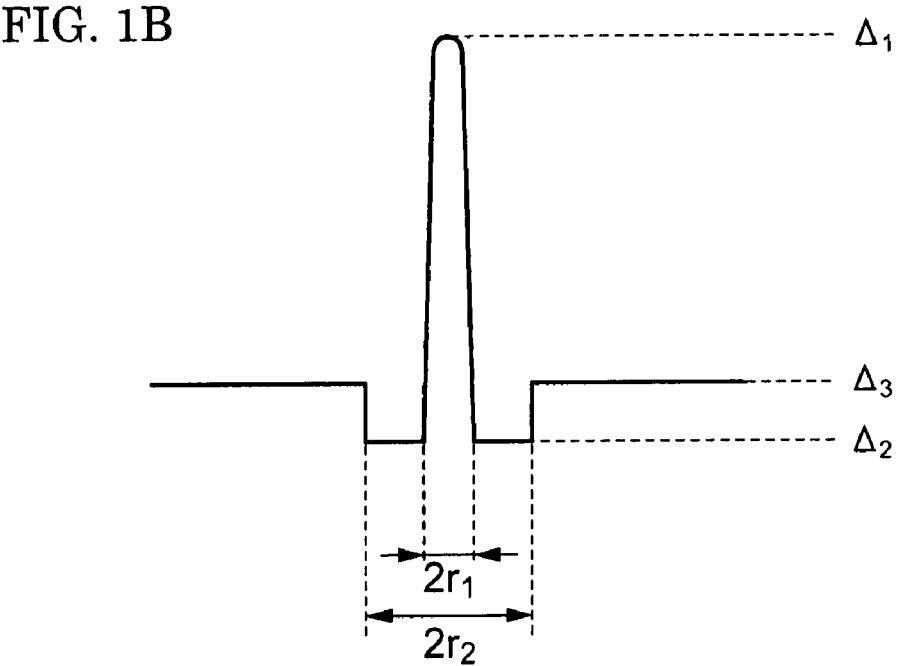
FIG. 1B is a conceptual view showing a refractive index profile of the optical fiber.

FIG. 1A is a cross-sectional view of an optical fiber 10 according to an embodiment of the present invention, and FIG. 1B is a conceptual view showing a refractive index profile of the optical fiber 10. The optical fiber 10 comprises a central core 11, a depressed region 12 surrounding the central core 11, and a cladding 13 surrounding the depressed region 12. The refractive index of the cladding 13 is smaller than that of the central core 11 and is larger than that of the depressed region 12.

The optical fiber 10 is made of $SiO_2$ as a main component, and the central core 11 contains $Al_2O_3$ at concentrations of 15 wt % or more. In addition, the optical fiber 10 is allowed to propagate only a fundamental mode and has an absolute value of chromatic dispersion of 5 ps/nm/km or less at a predetermined wavelength (e.g., a wavelength within a range of 1.4 μm-1.7 μm). Preferably, the absolute value of chromatic dispersion is 1 ps/nm/km or less.

Efficiency of the generation of the stimulated Brillouin scattering is expressed by a Brillouin gain $g_B$:

$$g_B = \frac{2\pi n^7 p_{12}^2}{c\lambda^2 \rho_0 v_a \Delta v_B} \qquad (1)$$

Also, the internal friction coefficient $\Gamma$ is expressed by the following formula (2):

$$\Gamma = 2\pi \Delta v_B \qquad \ldots (2)$$

In the formulae (1) and (2), n is the refractive index, c is the velocity of light in a vacuum, λ is the wavelength of light, $p_{12}$ is the Pockels constant, $\rho_0$ is the density of a medium, $v_a$ is the velocity of acoustic waves, the $\Delta_{v_B}$ is a full width half maximum of the Brillouin gain spectrum. As seen from those two formulae, when the internal friction coefficient $\Gamma$ increases, the Brillouin gain $g_B$ decreases.

Figure 2:
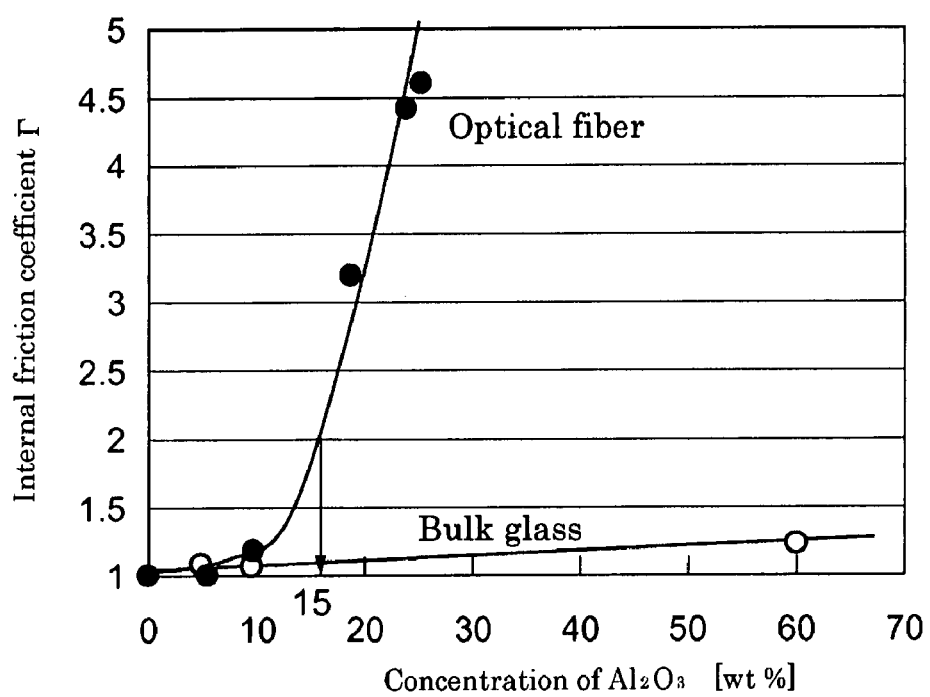
FIG. 2 is a graph showing the relationship between the internal friction coefficient Γ and the concentration of $Al_2O_3$ in an optical fiber and bulk glass.

FIG. 2 is a graph showing the relationship between the normalized internal friction coefficient $\Gamma$ with reference to the internal friction coefficient of pure silica glass and the concentration of $Al_2O_3$ in an optical fiber and a preform (i.e., bulk glass) of the optical fiber. Each of the optical fiber and the preform used herein has a central core which is made of $SiO_2$ as a main component and contains only $Al_2O_3$ as a dopant. As seen from FIG. 2, in the preform there is a weak proportional relation that the internal friction coefficient $\Gamma$ of $SiO_2$ increases as the concentration of $Al_2O_3$ increases. In contrast, in the optical fiber being drawn and having a reduced diameter, there is a noticeable tendency that the internal friction coefficient $\Gamma$ of $SiO_2$ increases as the concentration of $Al_2O_3$ increases. Such a tendency is particularly more noticeable when the concentration of $Al_2O_3$ is in a range of 15 wt % or more.

Thus, fiber drawing makes the internal friction coefficient $\Gamma$ large. In particular, when the concentration of $Al_2O_3$ is 15 wt % or more, the internal friction coefficient of the optical fiber is significantly increased twice or more than that of the preform. As a result, the Brillouin gain in the optical fiber can be reduced. Stated another way, the stimulated Brillouin scattering (SBS) threshold in an optical fiber can be increased and the generation of the stimulated Brillouin scattering is fairly suppressed. In addition, by setting the concentration of $Al_2O_3$ to be 15 wt % or more, the optical fiber 10 can be made to have a relative refractive index difference of 1.5% or more and nonlinearity twice or more than that of a standard single-mode optical fiber. On the other hand, if the concentration of $Al_2O_3$ is below 15 wt %, a significant increase of the internal friction coefficient is not obtained even with drawing into the fiber and the effect of suppressing the stimulated Brillouin scattering is hardly obtained.

To use the optical fiber 10 as a high performance highly nonlinear optical fiber, the central core 11 preferably has higher concentration of $Al_2O_3$ in order to increase the nonlinearity. If the concentration of $Al_2O_3$ in the central core 11 is 20 wt % or more, an optical fiber having the central core 11 can have a performance comparable to that of a widely used highly nonlinear optical fiber.

Preferably, the optical fiber 10 has an effective area of 15 μm² or less at the predetermined wavelength and also has the SBS threshold larger than, by 3 dB or more, that of an optical fiber including a central core made of $GeO_2$-$SiO_2$ glass and having a similar refractive index profile. An optical fiber having the effective are of 15 μm² or less can be obtained in a manner in which the concentration of $Al_2O_3$ in the central core 11 is 15 wt % or more,. As a result, the nonlinear constant of the optical fiber 10 can be significantly increased triple or more than that of a standard single-mode optical fiber. Further, the SBS threshold of the optical fiber 10 can be increased twice or more than that of a standard single-mode optical fiber.

If the refractive index of the central core 11 is increased with $Al_2O_3$ as a single dopant, a concentration of $Al_2O_3$ over 22 wt % is necessary. In such a case, growth of the crystal phase tends to progress during fabrication of the preform, and manufacturing of the optical fiber become difficult. To avoid such a difficulty, the central core 11 of the optical fiber 10 preferably contains one or more elements selected from among Ge, P, Ba, Pb, Ga, In and Tl. By adding one or more of those elements to the central core 11 in addition to Al, the relative refractive index difference of the central core 11 can be increased and the nonlinear constant can be obtained as a sufficient value while avoiding crystallization.

Further, by introducing, as a dopant, a substance having a small absolute value of the Pockels constant $P_{12}$ to the central core 11, an effect of further increasing an improvement of the SBS threshold to that in an optical fiber including a central core made of $GeO_2$ and $SiO_2$ glass and having a similar refractive index profile can be expected. In particular, glass having the Pockels constant smaller than 0.27, which is a Pockels constant of quartz, is preferably used as the material of the central core 11.

Preferably, the optical fiber 10 has a transmission attenuation of 70 dB/km or less at a wavelength of 1.55 μm. More specifically, the efficiency η of the nonlinear optical phenomenon in the optical fiber 10 is expressed by the following formulae (3a) and (3b);

$$\eta \propto PL_{eff} \qquad (3a)$$

$$L_{eff} = \frac{1 - \exp(-\alpha L)}{\alpha} \qquad (3b)$$

wherein P is the intensity of propagated light, $L_{eff}$ is the effective interaction length, α is the transmission attenuation, and L is the fiber length. As seen from those formulae, when the transmission attenuation α is large, the effective interaction length $L_{eff}$ decreases and the efficiency of the nonlinear optical phenomenon is not improved. By setting the transmission attenuation α to be 70 dB/km or less, the effective interaction length $L_{\it eff}$ can be a practically sufficient length. More preferably, the transmission attenuation α is 10 dB/km or less.

Further, the central core 11 of the optical fiber 10 preferably has a fictive temperature of 1100° C. or higher. By holding the fictive temperature within such a range, crystallization and phase separation can be suppressed and the transmission attenuation α of 70 dB/km or less can be realized. The fictive temperature can be adjusted by controlling a cooling rate during the drawing step.

The optical fiber 10, preferably, has a depressed region 12 having a negative relative refractive index difference $\Delta_2$ with respect to $SiO_2$ and surrounding the central core 11, and has a cladding 13 having a larger refractive index than the depressed region 12 and surrounding the depressed region 12, as shown in FIG. 1. In a refractive index profile of the highly nonlinear optical fiber in which the central core 11 has a relative refractive index difference $\Delta_1$ of 1.5% or more with respect to $SiO_2$, a substantial relative refractive index difference of the central core can be increased when the optical fiber has a depressed region, that is, the fiber has a W-shaped profile. Thus, higher nonlinearity can be obtained and a shorter cutoff wavelength can be realized as compared with an optical fiber without a depressed region.

Optical characteristics can be widely controlled with a more complicated refractive index profile. In that case, however, higher accuracy is required in a manufacturing process, because due to the more complicated refractive index profile, a difficulty is increased in fabricating the optical fiber and in suppressing a fluctuation of the zero dispersion wavelength in the longitudinal direction.

Preferably, the optical fiber 10 has polarization mode dispersion of 0.5 ps/km$^{1/2}$ or less at the predetermined wavelength. With the polarization mode dispersion of 0.5 ps/km$^{1/2}$ or less, the nonlinear optical phenomenon can be effectively generated.

The viscosity of the central core 11 containing high concentration of $Al_2O_3$ largely differs from those of the depressed region 12 and the cladding 13. Because of such a difference in viscosity between the optical core 11 and the cladding 13, it becomes difficult to keep the shapes of the preform and the optical fiber in the fabricating step of the optical fiber preform and the drawing step and the central core 11 is apt to be an elliptic shape. To avoid this problem, the cladding 13 preferably includes Fluorine as a dopant so that the cladding 13 has substantially the same viscosity as the central core 11. In addition, a difference $\Delta\log\eta$ in viscosity between the periphery of the central core 11 and the cladding 13 in the drawing step of the optical fiber 10 is preferably 2 or less and more preferably 1 or less.

The optical fiber 10 preferably has an absolute value of a dispersion slop of 0.06 ps/nm$^2$/km or less and has a higher-order chromatic dispersion $\beta_4$ of $1.0\times10^{-55}$ s$^4$/m or less at the transmission wavelength. By setting the higher-order chromatic dispersion $\beta_4$ to a smaller value, it is possible to widen a wavelength conversion bandwidth by four-wave mixing in the optical fiber 10. Herein, $\beta_4$ is the forth order derivation $$\beta_4 = \frac{d^4\beta}{d\omega^4}$$

in the Taylor series about an angular frequency $\omega_1$ as shown in the following formula (4), $$\beta = \beta_0 + \sum_{n=1}^{\infty} \frac{1}{n!}\beta_n(\omega - \omega_1)^n \qquad (4)$$
$$= \beta_0 + \beta_1(\omega - \omega_1) + \frac{1}{2}\beta_2(\omega - \omega_1)^2 +$$
$$\frac{1}{6}\beta_3(\omega - \omega_1)^3 + \frac{1}{24}\beta_4(\omega - \omega_1)^4 + \ldots$$

In the optical fiber 10, a fluctuation of the zero dispersion wavelength in the longitudinal direction is preferably nm or less per 100 m. When the optical fiber 10 constitutes an optical fiber device (e.g., a wavelength converter) utilizing the nonlinear optical phenomenon, the fluctuation of the zero dispersion wavelength in the longitudinal direction of the optical fiber 10 becomes a factor limiting a wavelength bandwidth in which the nonlinear optical phenomenon can be generated. By setting the fluctuation of the zero dispersion wavelength in the longitudinal direction of the optical fiber 10 to be 10 nm or less per 100 m, an optical flow device having a practically sufficient wavelength conversion bandwidth can be fabricated. Here, the fluctuation of the zero dispersion wavelength can be suppressed by decreasing a fluctuation of the refractive index profile in the longitudinal direction of the optical fiber 10.

Exemplifying examples A to H of the optical fiber 10 according to the embodiment of the present invention will be described below. Table lists specifications (including the relative refractive index difference $\Delta_1$ of the central core 11, the concentration of $Al_2O_3$ in the central core 11, the outer diameter $2r_1$ of the central core 11, the outer diameter $2r_2$ of the depressed region 12, the relative refractive index difference $\Delta_2$ of the depressed region 12, and the relative refractive index difference $\Delta_3$ of the cladding 13) and characteristics (including the dispersion slope, the effective area, the zero dispersion wavelength, the transmission attenuation, the polarization mode dispersion, and the improvement of the SBS threshold) of the optical fibers A to H. The characteristic values given in Table are values at a wavelength of 1550 nm. The improvement of the SBS threshold in the optical fiber of each example represents a value in comparison with the SBS threshold in a standard single-mode optical fiber which has a similar refractive index profile and contains $GeO_2$ in a central core. Each of the optical fibers A to H has the structure shown in FIG. 1.

TABLE

|  | A | B | C | D | E | F | G | H |
|---|---|---|---|---|---|---|---|---|
| Central core $\Delta_1$ [%] | 3 | 2.8 | 2.3 | 1.7 | 1.7 | 1.4 | 1 | 0.5 |
| Concentration of $Al_2O_3$ [wt %] | 29.9 | 27.9 | 22.9 | 17.0 | 17.0 | 14.0 | 10.0 | 5.0 |
| $2r_1$ [μm] | 4.4 | 4.0 | 3.9 | 4.7 | 4.2 | 4.4 | 4.5 | 10.0 |
| $2r_2$ [μm] | — | 13.4 | 13.1 | — | 14.0 | 14.6 | 14.9 | — |

TABLE-continued

|  | A | B | C | D | E | F | G | H |
|---|---|---|---|---|---|---|---|---|
| Depressed Region $\Delta_2$ [%] | 0 | −0.5 | −0.75 | 0 | −0.5 | −0.5 | −0.3 | 0 |
| Cladding $\Delta_3$ [%] | 0 | 0 | 0 | 0 | 0 | 0 | 0 | 0 |
| Dispersion slope [ps/nm$^2$/km] | 0.037 | 0.030 | 0.026 | 0.040 | 0.030 | 0.033 | 0.038 | 0.058 |
| Effective area [μm$^2$] | 11.1 | 10.2 | 10.8 | 17.9 | 14.2 | 16.2 | 22.1 | 65.0 |
| Zero dispersion wavelength [nm] | 1553 | 1560 | 1543 | 1545 | 1560 | 1557 | 1551 | 1320 |
| Transmission attenuation [dB/km] | 31 | 20 | 17 | 17 | 14 | 8 | 6 | 3 |
| Polarization mode dispersion [ps/√km] | 0.08 | 0.06 | 0.03 | 0.02 | 0.07 | 0.05 | 0.07 | 0.08 |
| Improvement of SBS threshold [dB] | 6 | 7.5 | 6.3 | 3.9 | 5.1 | 2.7 | 1 | 0.5 |

Figure 3:
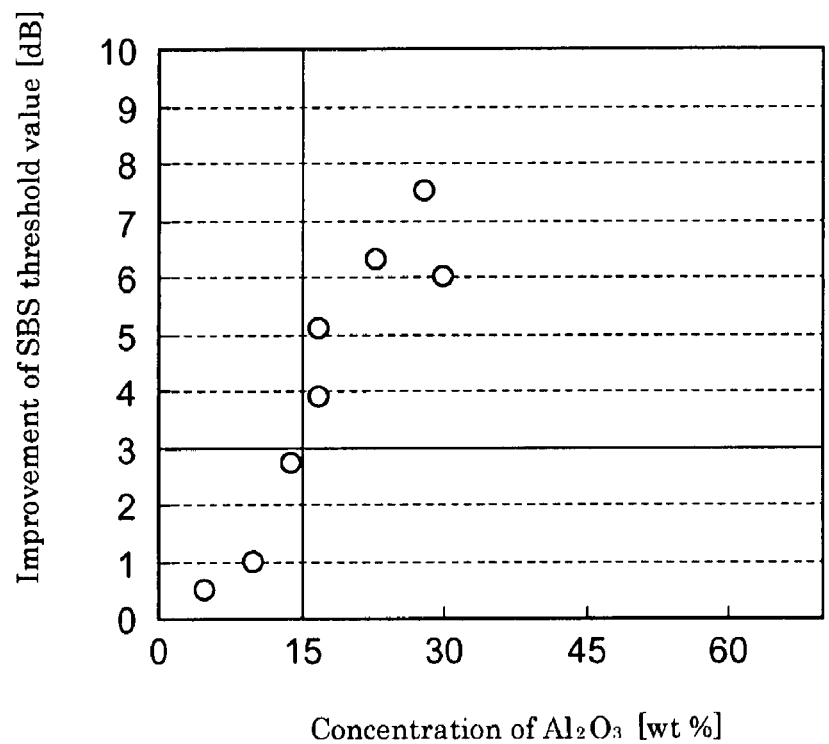
FIG. 3 is a graph showing the relationship between the concentration of $Al_2O_3$ and an improvement of the stimulated Brillouin scattering (SBS) threshold in the embodiment of the present invention to that in an optical fiber including a central core made of $GeO_2$-$SiO_2$ glass and having a similar refractive index profile.

FIG. 3 is a graph shown the relationship between the concentration of $Al_2O_3$ and the improvement of the SBS threshold in the optical fibers A to H according to the embodiment of the present invention. As the concentration of $Al_2O_3$ increases, the relative refractive index difference of the central core is increased and the improvement of the SBS threshold becomes large correspondingly. In a region where the concentration of $Al_2O_3$ is 15 wt % or more, the improvement of the SBS threshold is significantly large by 3 dB or more. The reason is that, as shown in FIG. 2, when the concentration of $Al_2O_3$ exceeds 15 wt %, the normalized internal friction coefficient of $SiO_2$ Γ with reference to the internal friction coefficient of pure silica glass is increased twice (3 dB) or more as the concentration of $Al_2O_3$ increases. The increase of the internal friction coefficient Γ of $SiO_2$ occurs only in the optical fiber, and does not occur in the bulk glass (preform).

Further, in order to increase the efficiency of the nonlinear optical phenomenon, the effective area of the optical fiber is preferably 15 μm$^2$ or less. In this manner, the nonlinear constant of 10/W/km or more can be obtained.

Figure 4:
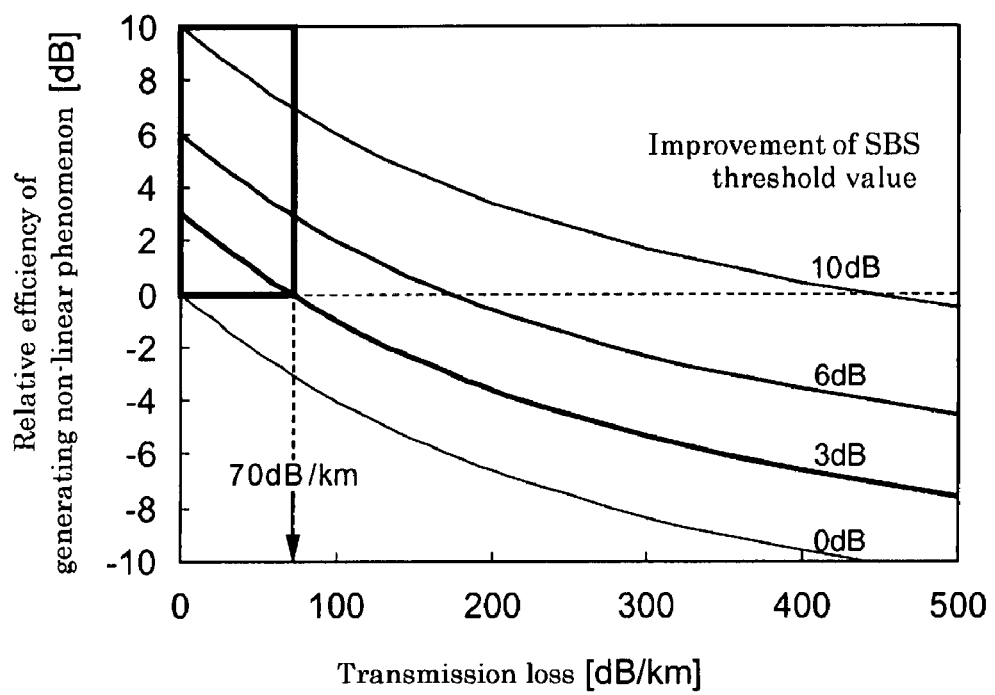
FIG. 4 is a graph showing the relationship between a relative efficiency of the nonlinear optical phenomenon and a transmission attenuation with respect to an improvement of the SBS threshold as a parameter.

FIG. 4 is a graph showing the relationship between a relative efficiency of the nonlinear optical phenomenon and a transmission attenuation with respect to the improvement of the SBS threshold as a parameter. Herein, the length of the optical fiber is set to 100 m which is a typical length in a practical use. A larger transmission attenuation means a smaller improvement in efficiency of the nonlinear optical phenomenon. In the optical fiber in which 3-dB improvement of the SBS threshold is obtained, the transmission attenuation which does not cancel the advantage of the 3-dB improvement of the SBS threshold is 70 dB/km or less. When the length of the optical fiber is further increased, the required transmission attenuation is further reduced. Assuming that the optical fiber is used in length of 1 km, the transmission attenuation is preferably 10 dB/km or less.

When the central core of the optical fiber is made of $SiO_2$ including $Al_2O_3$ as a dopant, the transmission attenuation in the optical fiber is attributable to two factors, i.e., absorption of light by impurities and scattering of light by crystallization and phase separation. Of those two factors, it is in particular important to suppress an increase of the transmission attenuation caused by the latter factor, i.e., scattering. For that purpose, the fictive temperature of the central core is preferably set to 1100° C. or higher. By holding the fictive temperature within such a range, crystallization and phase separation can be suppressed and the transmission attenuation of 70 dB/km or less can be realized. The fictive temperature can be adjusted by controlling a cooling rate during the drawing step.

The optical fiber device according to the present invention includes the optical fiber having the central core which is made of $SiO_2$ as a main component and contains $Al_2O_3$ at concentration of 15 wt % or more, the optical fiber guiding first light and second light having different wavelengths to propagate therethrough such that the first light and the second light interact with each other by a nonlinear optical phenomenon during the propagation, thus causing the optical fiber to output the first light or the second light modulated by the nonlinear optical phenomenon or third light newly produced by the nonlinear optical phenomenon and having a different wavelength. The optical fiber device according to the present invention may be practiced as a device that requires larger power of pump light which can be obtained by suppressing the generation of the SBS. The optical fiber device is, for example, a wavelength converter utilizing the four-wave mixing, an optical amplifier, or other devices utilizing phenomena such as self-phase modulation, mutual phase modulation, stimulated Raman scattering, and nonlinear polarization rotation. In the following, the wavelength converter and the optical amplifier are described as examples of the optical fiber device according to the present invention.

Figure 5:
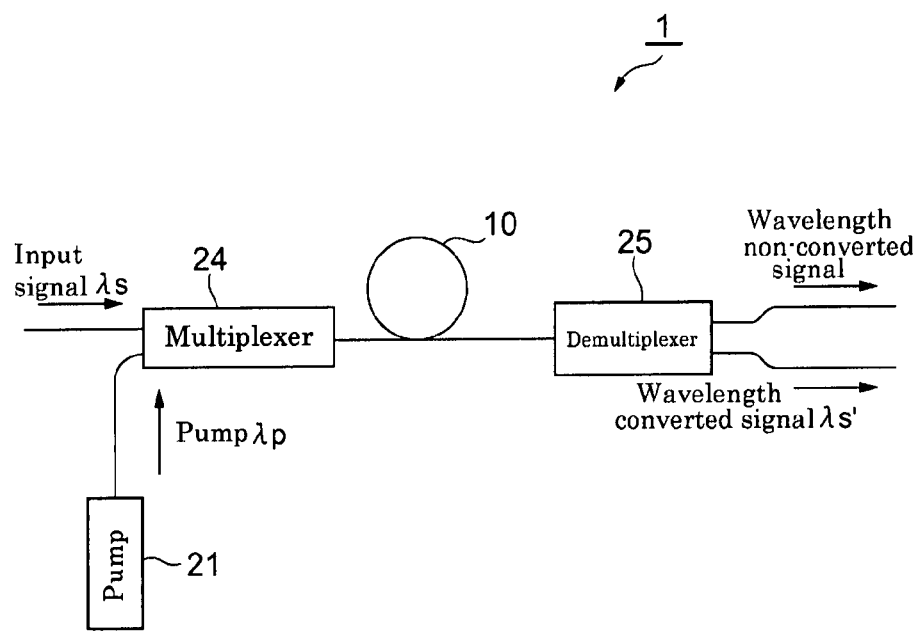
FIG. 5 is a conceptual view of a wavelength converter as one example of an optical fiber device according to the present invention.

FIG. 5 is a conceptual view of a wavelength converter 1 as one example of the optical fiber device according to the present invention. The wavelength converter 1 is an optical fiber device using, as a wavelength converting medium, the optical fiber 10 according to the embodiment of the present invention. The wavelength converter includes, in addition to the optical fiber 10, a pump 21, a multiplexer 24, and a demultiplexer 25. In the wavelength converter 1, the output from the pump 21 having a wavelength of λp is multiplexed with signal light having a wavelength λs in the multiplexer 24. The multiplexed pump light and signal light are launched into one end of the optical fiber 10 which serves as the wavelength converting medium, and then propagates through the optical fiber 10.

With the four-wave mixing, i.e., the nonlinear optical phenomenon developed during the light propagation through the optical fiber 10, new converted light having a wavelength $\lambda_s'$ different from those of the pump light and the signal light is generated in the optical fiber 10. The converted light exits the other end of the optical fiber 10 and is output to the exterior after selection by the demultiplexer 25. Intensity of the thus-output converted light of the wavelength $\lambda_s'$ changes over time according to that of the input signal light of the wavelength $\lambda_s$ and the converted light transmits the same information as the input signal light of the wavelength $\lambda_s$.

With the wavelength conversion described above, the output converted light of the wavelength $\lambda_s'$ has power in proportion to the square of the power of the pump light of wavelength $\lambda_p$, which propagates through the optical fiber 10. By using the optical fiber 10 in which the stimulated Brillouin scattering is suppressed, therefore, the pump light with larger power can be propagated through the optical fiber 10 and the efficiency of wavelength conversion can be increased.

Figure 6:
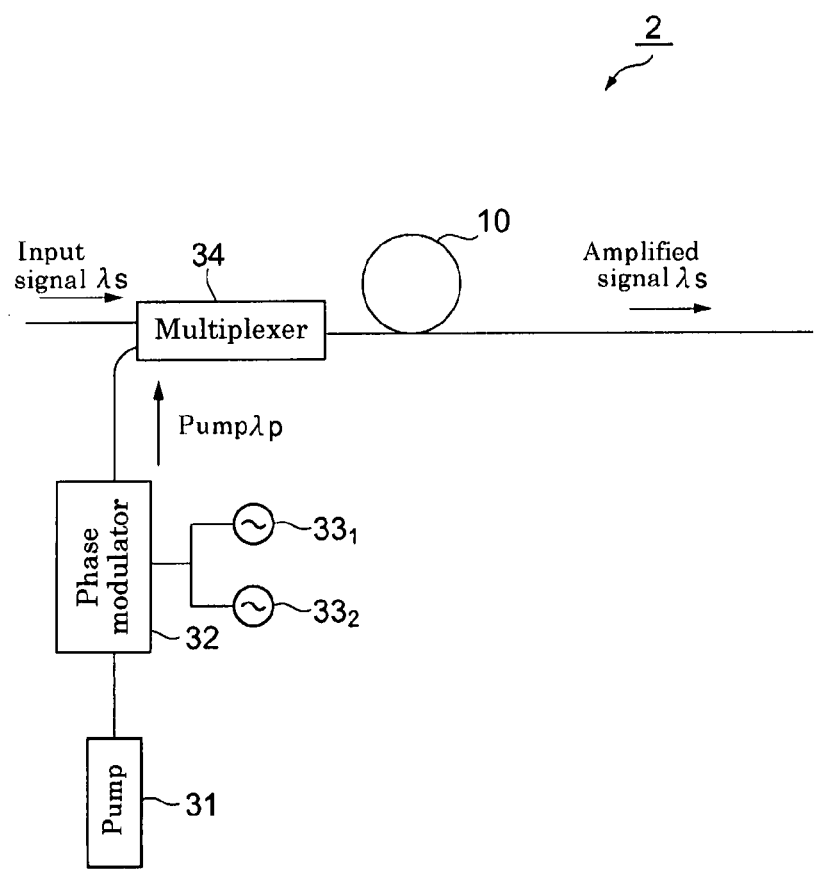
FIG. 6 is a conceptual view of an optical amplifier as another example of the optical fiber device according to the present invention.

FIG. 6 is a conceptual view of an optical amplifier 2 as another example of the optical fiber device according to the present invention. The optical amplifier 2 is an optical fiber device using, as a light amplifying medium, the optical fiber 10. The optical amplifier 2 includes, in addition to the optical fiber 10, a pump 31, a phase modulator 32, waveform generators 33$_1$ and 33$_2$, and a multiplexer 34. In the optical amplifier 2, the output from the pump 31 having a wavelength of $\lambda p$ is phase-modulated by the phase modulator 32 in accordance with modulation signals output from the waveform generators 33$_1$ and 33$_2$, and is then combined with signal light having a wavelength $\lambda_s$ in the multiplexer 34. The multiplexed pump light and signal light are launched into one end of the optical fiber 10 which serves as the light amplifying medium, and then propagate through the optical fiber 10. The signal light is amplified during the propagation through the optical fiber 10, and the amplified signal light exits from the other end of the optical fiber 10.

Generally, in the signal light amplification utilizing the nonlinear optical phenomenon, the pump light is subjected to the phase modulation to reduce the intensity of the pump light per unit wavelength width, whereby the SBS threshold is increased to prevent the stimulated Brillouin scattering. The SBS threshold can be increased about 5 dB per single waveform generator which applies the modulation signal to the phase modulator. Such an arrangement requires the phase modulator and a plurality of waveform generators. Hence, the configuration of the optical amplifier is more complicated. In contrast, by using, as the light amplifying medium, the optical fiber 10 in which the stimulated Brillouin scattering is suppressed and the SBS threshold of 6 dB is intrinsically increased, only two waveform generators 33 are required for the desired improvement of the SBS threshold of 15 dB, and the waveform generator 33 is no longer required for the desired improvement of the SBS threshold of 5 dB.

Thus, by using, as the light amplifying medium, the optical fiber 10 in which the stimulated Brillouin scattering is suppressed, the configuration of the optical amplifier 2 can be simplified. For example, an optical amplifier described in the paper, "IEEE J. SELECTED TOPICS IN QUANTUM ELECTRONICS", Vol. 8, No. 3, MAY/JUNE (2002) p. 506, employs four waveform generators. In contrast, by using the optical fiber 10 as the light amplifying medium, the required number of waveform generators can be cut one or two.

Generally, when a plurality of waveform generators are used, one modulation frequency is required to be set triple another modulation frequency (e.g., 100 MHz, 300 MHz, 900 MHz, and 1200 MHz). Also, as the frequency of phase modulation increases, the amplified signal light deteriorates to a larger extent. Therefore, by cutting the frequency of the phase modulation from the maximum one, therefore, the deterioration of the signal light can be prevented. By employing the optical fiber 10 as the light amplifying medium, the number of waveform generators used can be reduced to two. Further, even when the frequencies of those two waveform generators are limited to only a range of 1 GHz or lower, the pump light having sufficient intensity can be propagated through the optical fiber.

In addition, by using, as the light amplifying medium, the optical fiber 10 in which the stimulated Brillouin scattering is suppressed, a device for applying the phase modulation to the pump light is no longer required and the deterioration of the signal light can be prevented. It is also possible to manufacture a product utilizing the nonlinear optical phenomenon, such as an optical amplifier which has a small size and can save power.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

The entire disclosure of Japanese Patent Application No. 2006-246879 filed on Sep. 12, 2006 including specification, claims, drawings and summary is incorporated herein by reference in its entirety.

What is claimed is:

1. An optical fiber comprising a central core which is made of $SiO_2$ as a main component and contains $Al_2O_3$ at concentration of 15 wt % or more, the optical fiber being allowed to propagate only a fundamental mode and having an absolute value of chromatic dispersion of 5 ps/nm/km or less at a predetermined wavelength and an effective area of 15 µm$^2$ or less at the predetermined wavelength.

2. The optical fiber according to claim 1, wherein the central core contains one or more elements selected from among Ge, P, Ba, Pb, Ga, In and Tl.

3. The optical fiber according to claim 1, wherein a transmission attenuation is 70 dB/km or less at a wavelength of 1.55 µm.

4. The optical fiber according to claim 1, wherein the optical fiber further comprises a depressed region surrounding the central core and having a negative relative refractive index difference with respect to $SiO_2$, and a cladding surrounding the depressed region and having a larger refractive index than the depressed region.

5. An optical fiber device comprising an optical fiber having a central core which is made of $SiO_2$ as a main component and contains $Al_2O_3$ at concentration of 15 wt % or more, the optical fiber guiding first light and second light having different wavelengths such that the first light and the second light interact with each other by a nonlinear optical phenomenon during the propagation, thus causing the optical fiber to output the first light or the second light modulated by the nonlinear optical phenomena or third light newly produced by the nonlinear optical phenomenon and having a different wavelength, wherein the optical fiber has an effective area of 15 µm$^2$ or less at the predetermined wavelength of the first light or the second light.

6. The optical fiber device according to claim 5, wherein one of the first light and the second light is light to be amplified, and the other of the first light and the second light is pump light modulated at a frequency of 1 GHz or lower, the pump light amplifying the light to be amplified in the optical fiber.

7. The optical fiber device according to claim 5, wherein one of the first light and the second light is light to be amplified, and the other of the first light and the second light is pump light, the pump light being launched into the optical fiber output being modulated, thus amplifying the light to be amplified in the optical fiber.

* * * * *